United States Patent
Seo

(10) Patent No.: US 9,080,892 B2
(45) Date of Patent: Jul. 14, 2015

(54) MOBILE TERMINAL AND METHOD OF CONTROLLING THE SAME

(75) Inventor: Jaehong Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 13/597,839

(22) Filed: Aug. 29, 2012

(65) Prior Publication Data

US 2013/0124084 A1 May 16, 2013

(30) Foreign Application Priority Data

Nov. 15, 2011 (KR) .................. 10-2011-0118724

(51) Int. Cl.
  *G01C 21/32* (2006.01)
  *G01C 21/34* (2006.01)
  *G01C 21/36* (2006.01)

(52) U.S. Cl.
  CPC ................... *G01C 21/3638* (2013.01)

(58) Field of Classification Search
  CPC ........ G01C 21/00; G01C 21/32; G01C 21/34; G01C 21/206; G01C 21/3629; G01C 21/3638; G09B 29/003; G09B 29/10; G06F 3/04815; G06F 17/30241

USPC .............. 701/436, 455, 433, 450, 457, 532; 345/5

See application file for complete search history.

(56) References Cited

U.S. PATENT DOCUMENTS

| | | | | |
|---|---|---|---|---|
| 8,195,386 | B2* | 6/2012 | Hu et al. | 701/436 |
| 8,386,173 | B2* | 2/2013 | Muzina et al. | 701/455 |
| 2002/0158812 | A1* | 10/2002 | Pallakoff | 345/5 |
| 2011/0022311 | A1* | 1/2011 | Lee | 701/208 |
| 2012/0078509 | A1* | 3/2012 | Choi | 701/423 |
| 2012/0226439 | A1* | 9/2012 | Chan | 701/450 |

FOREIGN PATENT DOCUMENTS

| | | | |
|---|---|---|---|
| BE | WO 2010105934 A1 | * | 9/2010 |
| KR | 20090075022 | * | 7/2009 |

* cited by examiner

*Primary Examiner* — John Q Nguyen
*Assistant Examiner* — Aaron Smith
(74) *Attorney, Agent, or Firm* — Birch, Stewart, Kolasch & Birch, LLP

(57) ABSTRACT

A mobile terminal and a method of controlling the same are provided. The mobile terminal selectively provides 2D map data and 3D map data according to a predetermined event in a navigation mode, and thus by calling a driver's attention, the driver's visibility is improved, and a more accurate navigation service can be provided.

12 Claims, 24 Drawing Sheets

FIG. 5
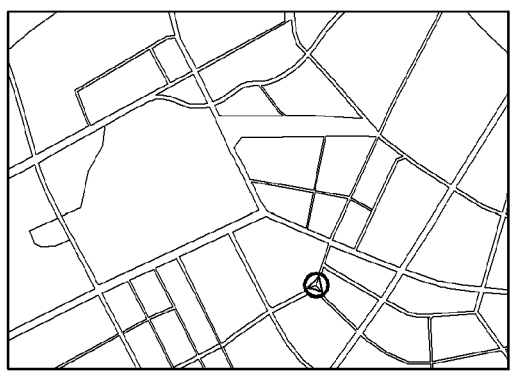
(a)
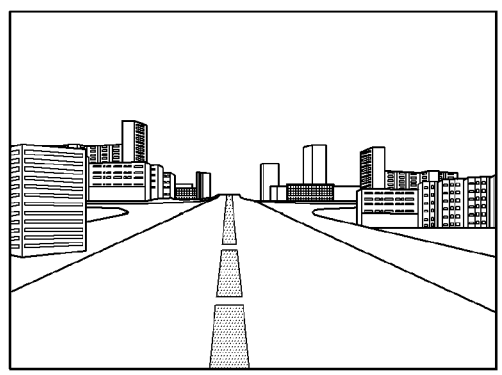
(b)

FIG. 7
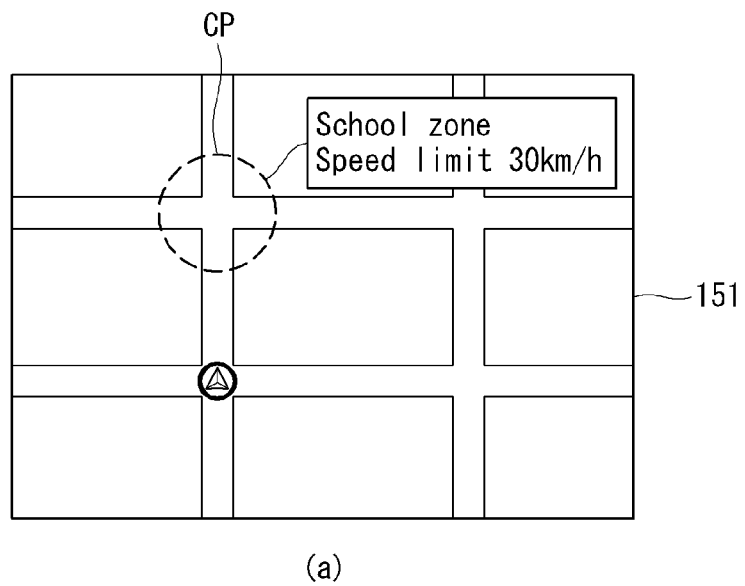
(a)
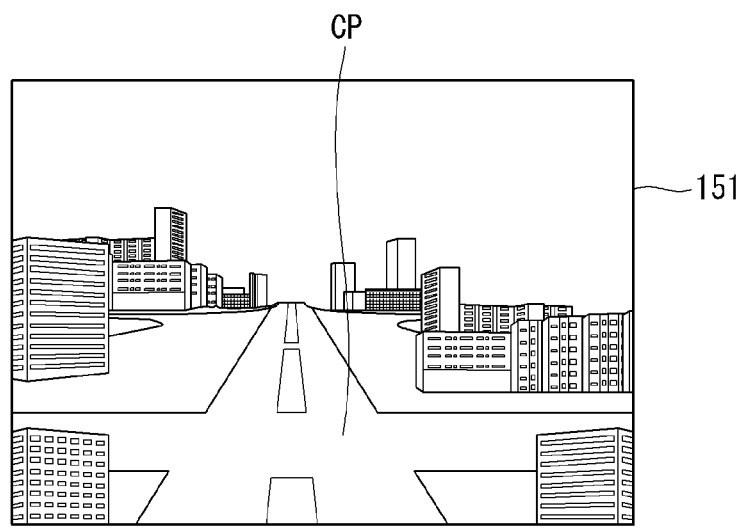
(b)

FIG. 8
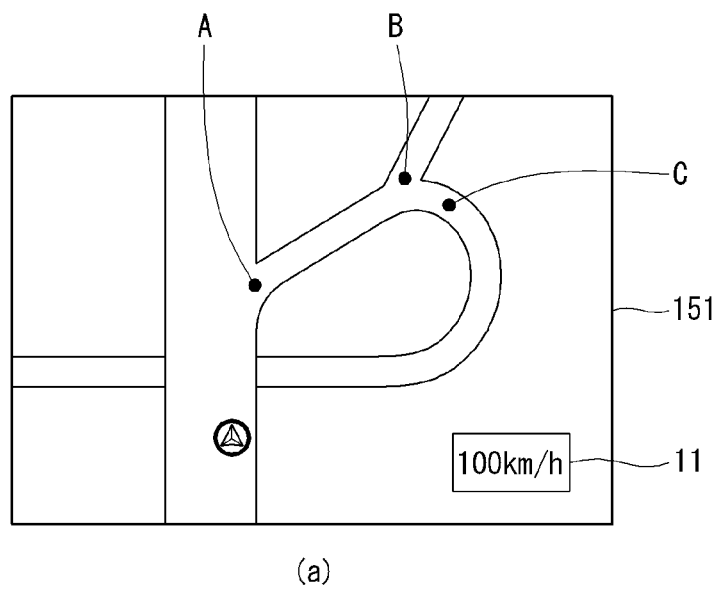
(a)
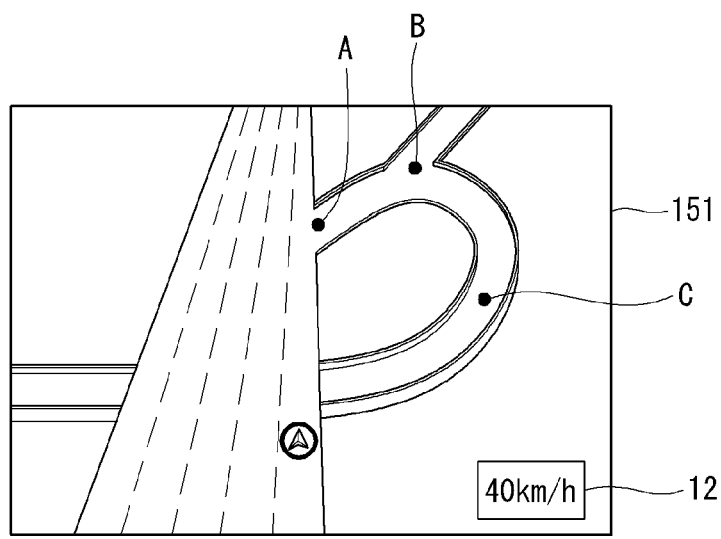
(b)

FIG. 10
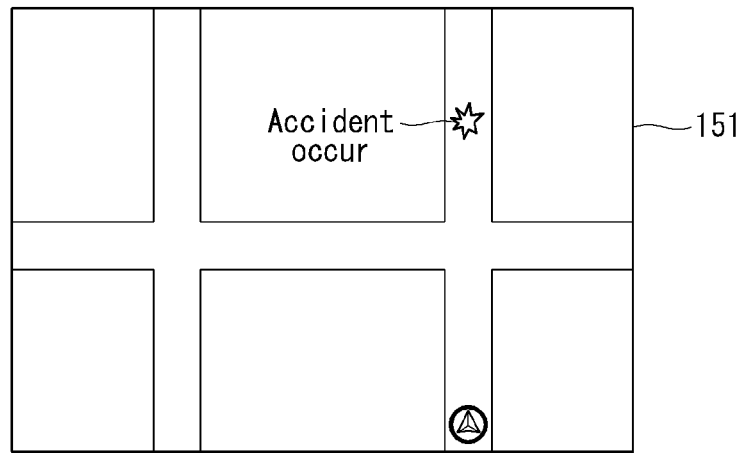
(a)
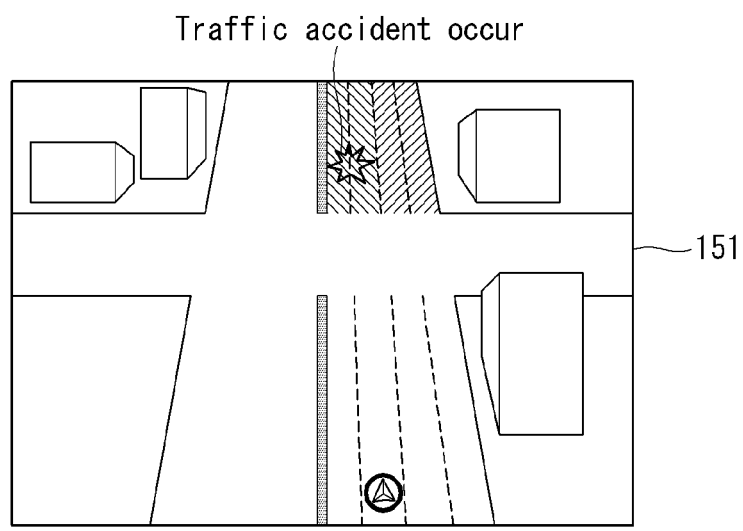
(b)

FIG. 14
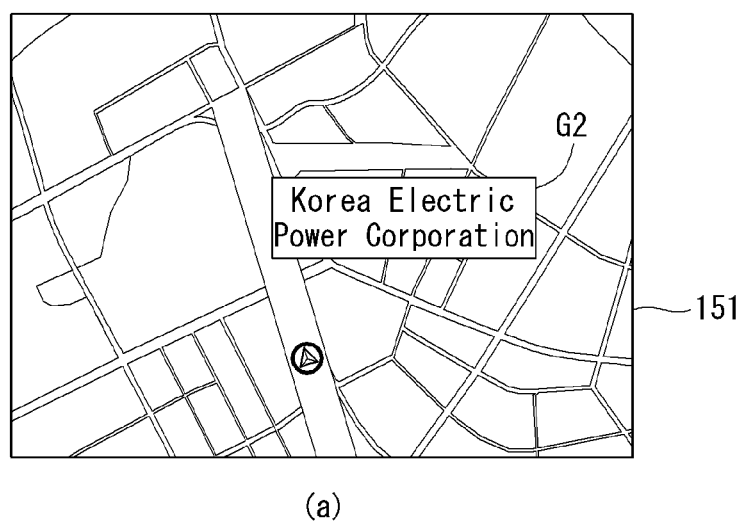
(a)
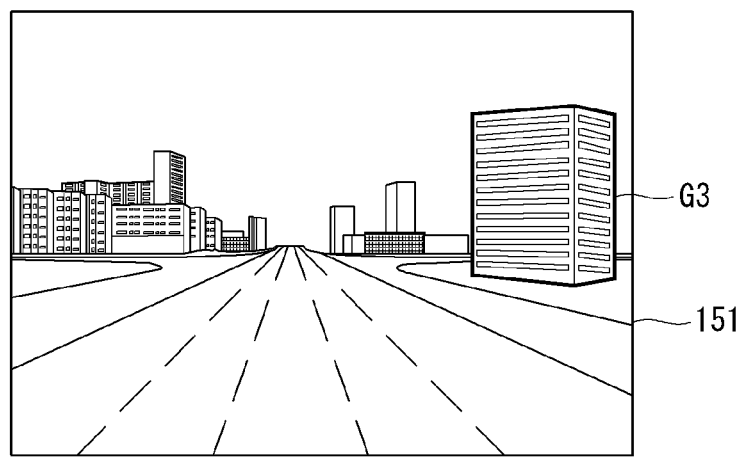
(b)

(a)     (b)

MOBILE TERMINAL AND METHOD OF CONTROLLING THE SAME

Pursuant to 35 U.S.C. §119(a), this application claims the benefit of earlier filing date and right of priority to Korean Patent Application No. 10-2011-0118724, filed on Nov. 15, 2011, the contents of which are hereby incorporated by reference herein in its entirety.

FIELD OF THE INVENTION

The present invention relates to a mobile terminal and a method of controlling the same.

RELATED ART

Navigation devices are loaded (or mounted) in moving bodies such as vehicles, receive present coordinate values thereof from global positioning system (GPS) satellites in the sky through built-in GPS receivers or removable GPS receivers provided therein and display various service information necessary for a navigation function, for example, present positions of moving bodies, traveling directions of moving bodies, distances to destinations, present moving speeds of moving bodies, routes set by drivers before traveling, and optimal routes to a destination, and provide various services necessary for traveling (driving).

The navigation device calculates a present position of a moving body (vehicle) by receiving electric waves representing a latitude, a longitude, and an altitude from a plurality of artificial satellites connected to a GPS, reads map information and related voice information corresponding to the calculated present position from a map related database, and visually and aurally provides the map information and related voice information through a monitor and/or a speaker. In this case, a provided map information screen generally shows a road form and a traveling route with a 2D map screen.

Such a navigation device provides roads with a 2D map screen regardless of a speed or a speed change amount of a moving body. However, a motion of the moving body and a speed, a location, and an environment in which the moving body moves may change in real time, and it is necessary to provide a more accurate route guidance service to a user under such various conditions.

SUMMARY

An aspect of the present invention is to provide a mobile terminal and a method of controlling the same that can selectively use 2D map data and 3D map data according to various driving conditions of a moving body.

Another aspect of the present invention is to provide a mobile terminal and a method of controlling the same that can selectively use 2D map data and 3D map data by detecting a speed of a moving body or a speed change amount of a moving body.

Another aspect of the present invention is to provide a mobile terminal and a method of controlling the same that can selectively use 2D map data and 3D map data based on a sensing result value of a sensing unit provided in the mobile terminal.

The object of the present invention is not limited to the above-described objects and the other objects will be understood by those skilled in the art from the following description.

In an aspect, a mobile terminal includes: a display unit; a database including 2D map data and 3D map data; and a controller for controlling to selectively display 2D map data or 3D map data corresponding to a traveling route of a moving body according to a predetermined event in a navigation mode.

The controller may convert the 2D map data to 3D map data corresponding to the 2D map data, when the predetermined event is received while displaying the 2D data.

The mobile terminal may further include a sensing unit, and the controller may control the display unit to selectively display the 2D map data or the 3D map data according to speed information including at least one of a speed and a speed change amount of the mobile terminal through the sensing unit.

The sensing unit may include at least one of a GPS receiving unit and an acceleration sensor.

The controller may convert the 2D map data to the 3D map data, if a speed of the mobile terminal is less than a predetermined threshold or if a deceleration change amount of the speed is larger than a predetermined threshold.

The controller may control to display the 2D map data and 3D map data based on traffic jam segment information by TPEG data and speed information of the mobile terminal.

The mobile terminal may further include a location information module, wherein the controller may convert the 2D map data to the 3D map data when the mobile terminal arrives at the predetermined location.

The controller may control the display unit to highlight a facility on map data, or to display detailed information within the facility or a real picture image of the facility, when the facility exists at a predetermined location.

The mobile terminal may further include a photosensitive sensor for detecting light, wherein the controller may provide an inside route of the facility with a 3D image, when a facility exists at a predetermined location and illumination of light detected by the photosensitive sensor is a predetermined threshold or less.

The mobile terminal may further include a GPS receiving unit, wherein the controller may provide an inside route of the facility with a 3D image based on illumination of light detected by the photosensitive sensor and sensitivity of a GPS signal acquired through the GPS receiving unit.

The mobile terminal may further include a mobile communication module for connecting a communication call, and when the communication call is connected through the mobile communication module, the controller may convert the 2D map data to the 3D map data.

The mobile terminal may further include a gyro sensor for detecting a rotation amount of the mobile terminal, and if a lateral rotation amount is larger than a predetermined threshold based on a traveling direction of the mobile terminal, the controller may convert the 2D map data to the 3D map data.

In another aspect, a mobile terminal includes: a sensing unit for detecting a speed of the mobile terminal; a display unit for displaying 2D map data; and a controller for controlling to acquire speed information including at least one of a speed and a speed change amount of the mobile terminal through the sensing unit, to convert the 2D map data to 3D map data corresponding to the 2D map data according to the speed information, and to display the 3D map data in a navigation mode.

In another aspect, a method of controlling a mobile terminal includes: entering a navigation mode; displaying 2D map data corresponding to a moving route in a display unit; and controlling to selectively display the 2D map data and 3D map data according to a predetermined event.

In another aspect, a method of controlling a mobile terminal includes: entering a navigation mode; displaying 2D map data corresponding to a moving route in a display unit; acquiring speed information including a speed and a speed change amount of the mobile terminal through a sensing unit; and converting the 2D map data to 3D map data corresponding to the 2D map data according to the speed information and displaying the 3D map data in the display unit.

The detailed matters of the embodiments will be included in the detailed description and the drawings.

[Advantages]

A mobile terminal and a method of controlling the same according to an embodiment of the present invention have the following effects.

According to the present invention, 2D map data and 3D map data can be selectively used according to various driving conditions of a moving body.

Further, according to the present invention, by detecting a speed or a speed change amount of a moving body, 2D map data and 3D map data can be selectively used.

Further, according to the present invention, 2D map data and 3D map data can be selectively used based on a sensing result value of a sensing unit provided in the mobile terminal.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

FIG. 5 is a diagram illustrating step 120 shown in FIG. 4.

FIGS. 7 to 11 are diagrams illustrating the method shown in FIG. 6.

FIGS. 14 to 16 are diagrams illustrating the method shown in FIG. 13.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
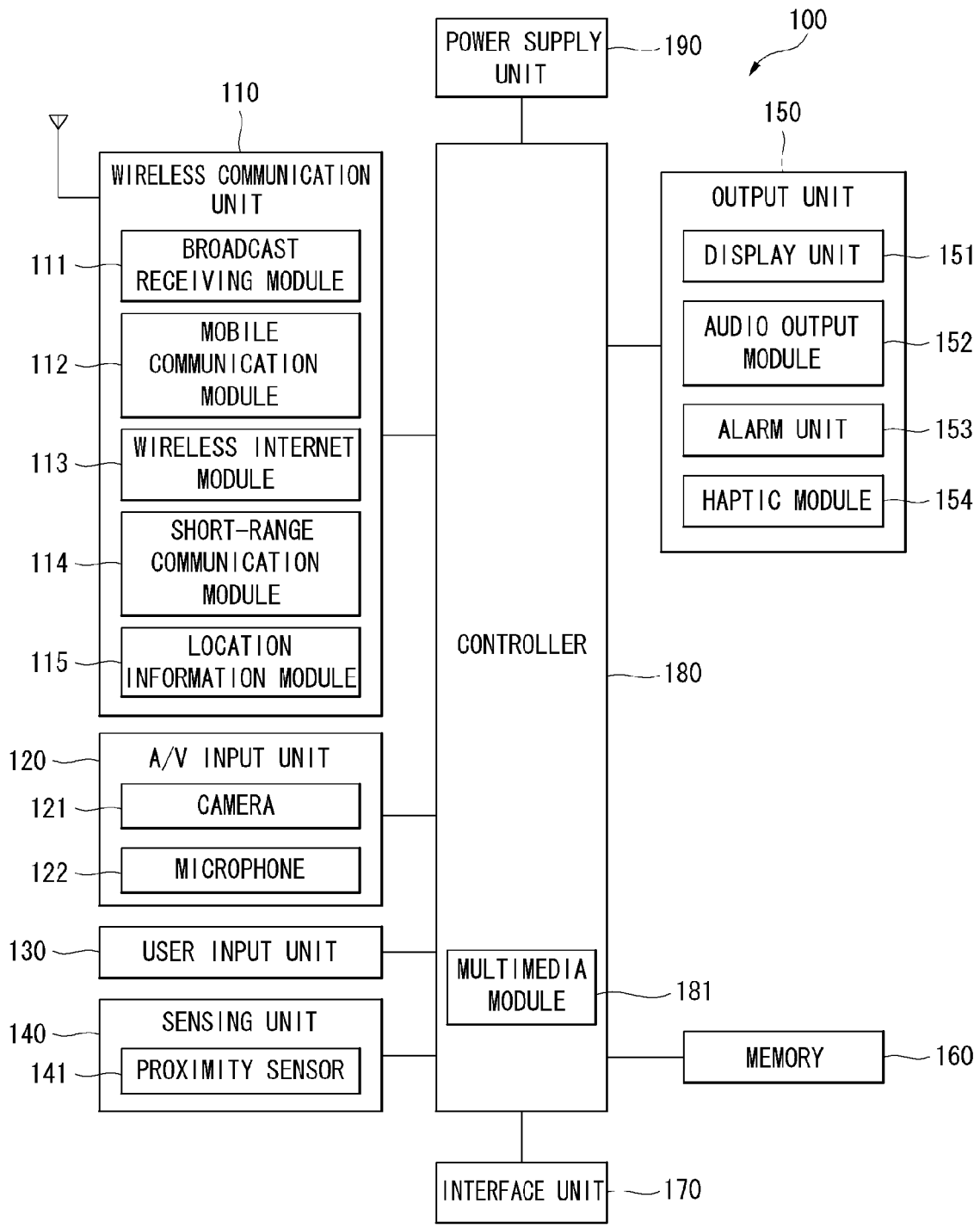
FIG. 1 is a block diagram illustrating a configuration of a mobile terminal according to an embodiment of the present invention.

FIG. 1 is a block diagram of a mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but implementing all of the illustrated components is not a requirement. Greater or fewer components may alternatively be implemented.

In addition, the wireless communication unit 110 generally includes one or more components allowing radio communication between the mobile terminal 100 and a wireless communication system or a network in which the mobile terminal is located. For example, in FIG. 1, the wireless communication unit includes at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®), the integrated services digital broadcast-terrestrial (ISDB-T) system, etc.

The broadcast receiving module 111 can also be configured to be suitable for all broadcast systems that provide a broadcast signal as well as the above-mentioned digital broadcast systems. In addition, the broadcast signals and/or broadcast-associated information received via the broadcast receiving module 111 may be stored in the memory 160.

In addition, the mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

Also, the location information module 115 is a module for checking or acquiring a location or position of the mobile terminal. The location information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 1, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored in the memory 160 or transmitted via the wireless communication unit 110. Two or more cameras 121 may also be provided according to the configuration of the mobile terminal.

In addition, the microphone 122 can receive sounds via a microphone in a phone call mode, a recording mode, a voice recognition mode, and the like, and can process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

Also, the user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

Further, the sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. In FIG. 1, the sensing unit 140 also includes a proximity sensor 141.

In addition, the output unit 150 is configured to provide outputs in a visual, audible, and/or tactile manner. In the example in FIG. 1, the output unit 150 includes the display unit 151, an audio output module 152, an alarm unit 153, a haptic module 154, and the like. In more detail, the display unit 151 can display information processed in the mobile terminal 100. For example, when the mobile terminal 100 is in a phone call mode, the display unit 151 can display a User Interface (UI) or a Graphic User Interface (GUI) associated with a call or other communication.

The display unit 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

Further, the mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 can function as both an input device and an output device. The touch sensor may have a form of a touch film, a touch sheet, a touch pad, and the like.

Further, the touch sensor may be configured to convert pressure applied to a particular portion of the display unit 151 or a change in the capacitance or the like generated at a particular portion of the display unit 151 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display unit 151 has been touched.

With reference to FIG. 1, the proximity sensor 141 may be disposed within or near the touch screen. In more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

Further, the audio output module 152 can convert and output as sound audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack.

In addition, the alarm unit 153 can output information about the occurrence of an event of the mobile terminal 100. Typical events include call reception, message reception, key signal inputs, a touch input etc. In addition to audio or video outputs, the alarm unit 153 can provide outputs in a different manner to inform about the occurrence of an event. For example, the alarm unit 153 can provide an output in the form of vibrations. The video signal or the audio signal may be also output through the display unit 151 or the audio output module 152.

In addition, the haptic module 154 generates various tactile effects the user may feel. One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Further, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Also, the interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected with an external cradle, the interface unit 170 can also serve as a passage to allow power from the cradle to be supplied therethrough to the mobile terminal 100 or serve as a passage to allow various command signals input by the user from the cradle to be transferred to the mobile terminal therethrough. Various command signals or power input from the cradle may operate as signals for recognizing that the mobile terminal is properly mounted on the cradle.

In addition, the controller 180 controls the general operations of the mobile terminal. For example, the controller 180 performs controlling and processing associated with voice calls, data communications, video calls, and the like. In the example in FIG. 1, the controller 180 also includes a multimedia module 181 for reproducing multimedia data. The multimedia module 181 may be configured within the controller 180 or may be configured to be separated from the controller 180. The controller 180 can also perform a pattern recognition processing to recognize a handwriting input or a picture drawing input performed on the touch screen as characters or images, respectively.

Also, the power supply unit 190 receives external power or internal power and supplies appropriate power required for operating respective elements and components under the control of the controller 180. Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
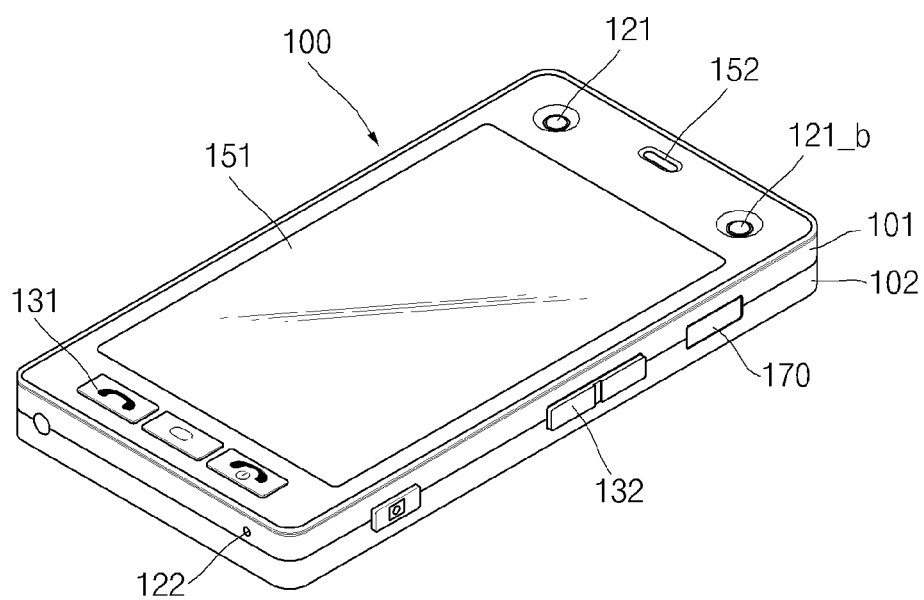
FIG. 2A is a front perspective view illustrating a mobile terminal according to an embodiment of the present invention.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
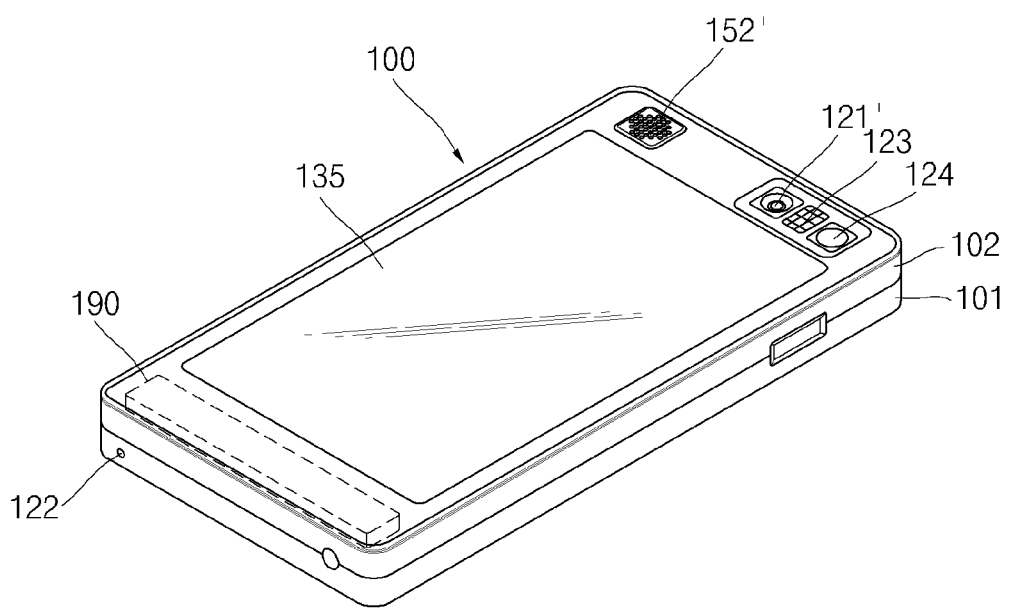
FIG. 2B is a rear perspective view illustrating the mobile terminal shown in FIG. 2A.

FIG. 2B is a rear perspective view of the handheld terminal shown in FIG. 2A according to an embodiment of the present invention.

Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna 124 can be additionally attached to the side of the terminal body in addition to an antenna for telephone calls. The antenna 124 constructing a part of the broadcasting receiving module 111 shown in FIG. 1 can be set in the terminal body such that the antenna 124 can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102. The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Hereinafter, exemplary embodiments of the present invention will be described. In the present invention, for convenience of description, it is assumed that the display unit 151 provided in the mobile terminal 100 is the touch screen 151. As described above, the touch screen 151 can perform both an information display function and an information input function. However, the present invention is not limited thereto. Further, a touch described in this document may include both a contact touch and a proximity touch.

Figure 3:
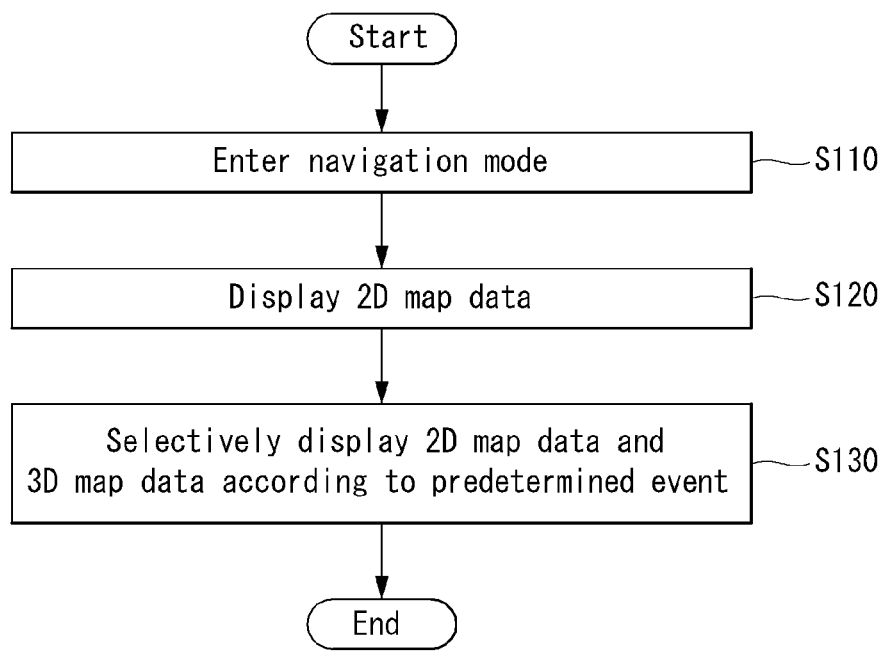
FIG. 3 is a flowchart illustrating a method of controlling a mobile terminal according to an embodiment of the present invention.
Figure 4:
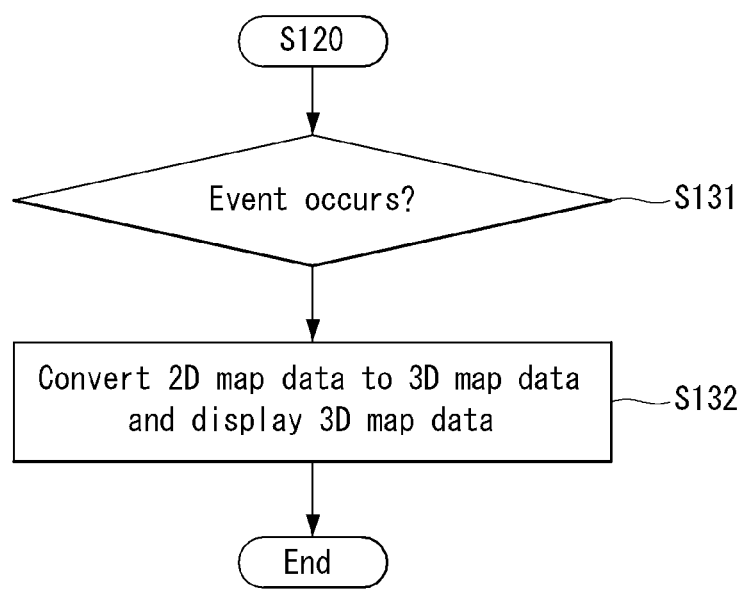
FIG. 4 is a flowchart illustrating step 120 in a process of the control method shown in FIG. 3.

FIG. 3 is a flowchart illustrating a method of controlling a mobile terminal according to an embodiment of the present invention, FIG. 4 is a flowchart illustrating step 120 in a process of the control method shown in FIG. 3, and FIG. 5 is a diagram illustrating step 120 shown in FIG. 4. The control method can be executed by the control of the controller 180.

Referring to FIG. 3, the mobile terminal 100 enters a navigation mode (S110).

When the mobile terminal 100 enters a navigation mode, the controller 180 controls to display 2D map data on the touch screen 151 (S120).

The memory 160 of the mobile terminal 100 stores 2D map data and 3D map data corresponding to the 2D map data.

In the navigation mode, when a predetermined event occurs in the mobile terminal 100, the controller 180 controls to selectively display 2D map data and 3D map data stored in the memory 160 on the touch screen 151 (S130).

When entering a navigation mode by a user's setting, the controller 180 controls to generally display 2D map data on the touch screen 151. In the navigation mode, it may be set by a user whether to display at least one of 2D map data and 3D map data or to selectively display the two map data. Alternatively, in a situation in which 2D map data are displayed on the touch screen 151, when a predetermined event occurs, it may be set to automatically convert the 2D map data to 3D map data and to display the 3D map data.

A method of displaying 2D map data and 3D map data on the touch screen 151 according to an embodiment of the present invention is not limited to the above-described example and may be variously modified and performed.

Referring to FIG. 4, in a navigation mode, in a situation in which 2D map data are displayed, the controller 180 determines whether a predetermined event occurs (S131), and if a predetermined event occurs, the controller 180 controls to convert the 2D map data to 3D map data and to display the 3D map data on the touch screen 151 (S132).

FIG. 5A illustrates an example in which the mobile terminal 100 displays 2D map data on the touch screen 151 in a navigation mode. FIG. 5B illustrates an example of automatically converting 2D map data displayed on the touch screen 151 to 3D map data and displaying the 3D map data.

The present invention is not limited thereto. For example, in order to convert and display some area of 2D map data displayed on the touch screen 151 to 3D map data or to highlight and display a specific area of the 2D map data, the controller 180 of the mobile terminal 100 may control to display the specific area with a 3D image and to overlappingly display the 3D image and the 2D map data.

Hereinafter, an event of selectively displaying the 2D map data and 3D map data, or of automatically converting the 2D map data to the 3D map data will be described in detail.

According to an embodiment of the present invention, in a navigation mode, when a moving body moves in a high speed, 2D map data can be displayed, and when a moving body moves in a low speed, 3D map data can be displayed.

Further, according to an embodiment of the present invention, when a speed change amount of a moving body rapidly changes, a display of map data can be controlled.

Figure 6:
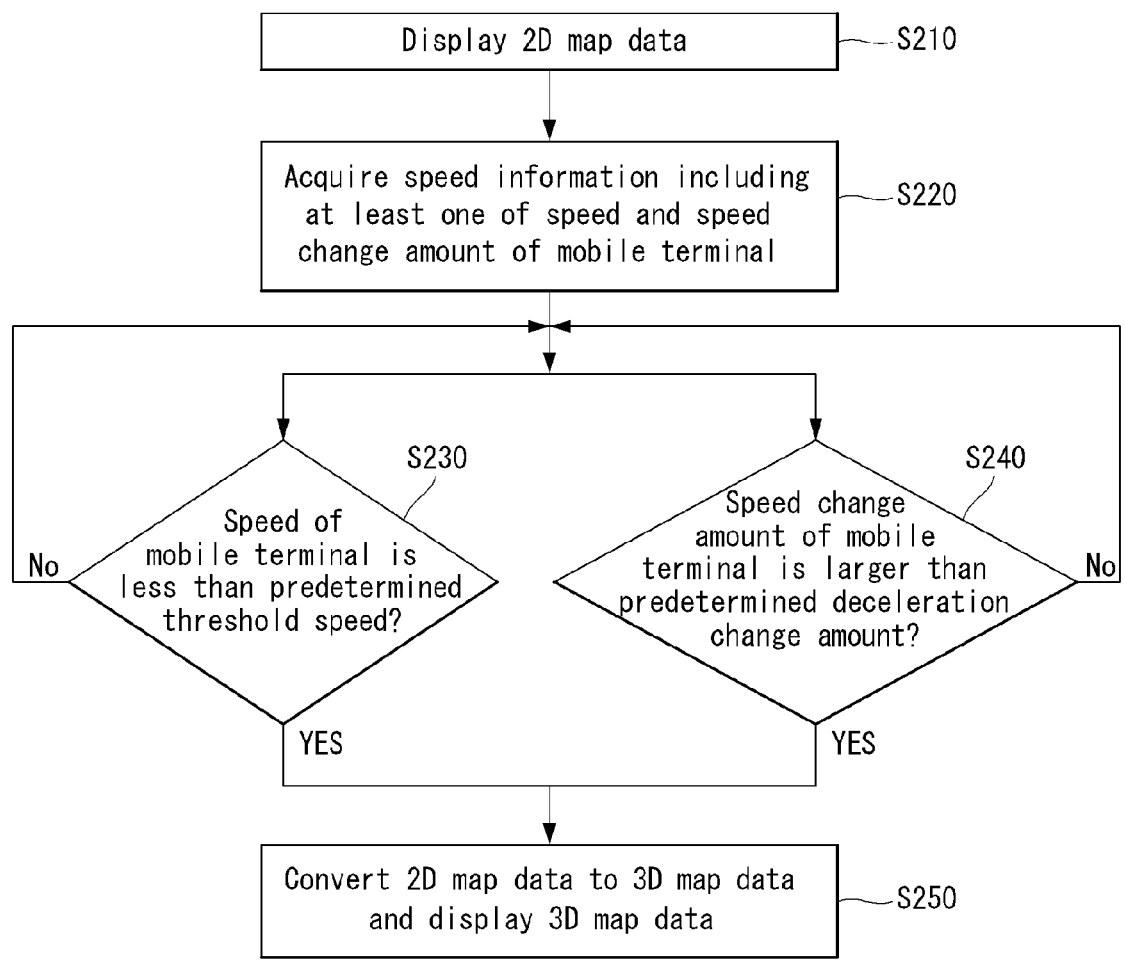
FIG. 6 is a flowchart illustrating a method of controlling a mobile terminal according to an embodiment of the present invention.

FIG. 6 is a flowchart illustrating a method of controlling a mobile terminal according to an embodiment of the present invention.

Referring to FIG. 6, according to an embodiment of the present invention, the controller 180 controls a screen display in a navigation mode of the mobile terminal according to a speed of the moving body.

The mobile terminal 100 displays 2D map data in a navigation mode (S210).

The controller 180 acquires speed information including at least one of a speed and a speed change amount of the mobile terminal (S220).

The mobile terminal 100 acquires the speed information through the sensing unit (140 of FIG. 1). The sensing unit 140 may include an acceleration sensor and a gyro sensor. The mobile terminal 100 may exist within a moving body moving with a predetermined speed, and a speed value in which the moving body moves may be obtained through an acceleration sensor provided in the mobile terminal 100.

The speed information may include an absolute velocity and a relative speed change amount of the mobile terminal 100. The absolute velocity is a moving speed of the mobile terminal 100 obtained from a GPS signal acquired through the location information module 115 (see FIG. 1), for example, the GPS receiving unit of the mobile terminal 100. Alternatively, a speed change amount may be obtained through a sensing value of an acceleration sensor provided in the mobile terminal 100.

First, an example of controlling a screen in a navigation mode according to an absolute velocity of the mobile terminal 100 will be described.

The controller 180 determines whether a speed of the mobile terminal 100 is less than a predetermined threshold speed (S230), and if a speed of the mobile terminal 100 is less than a predetermined threshold speed, the controller 180 automatically converts 2D map data displayed on the touch screen 151 to 3D map data.

For example, FIG. 7 illustrates an example of automatically converting 2D screen to a 3D screen when a moving body moves in a speed of a predetermined speed limit or less at a segment of the predetermined speed limit.

Referring to FIG. 7, a speed limit of a school zone (CP) is 30 Km/h and in the CP, a speed value acquired through the mobile terminal 100 may be less than 30 Km/h. In this case, the controller 180 may automatically convert 2D map data to 3D map data and provide the CP in more detail.

An example of controlling a screen in a navigation mode according to a speed change amount of the mobile terminal 100 will be described.

The controller 180 determines whether a speed change amount of the mobile terminal 100 is larger than a predetermined deceleration change amount (S240), and if a speed change amount of the mobile terminal 100 is larger than a predetermined deceleration change amount, the controller 180 automatically converts 2D map data displayed on the touch screen 151 to 3D map data (S250). The predetermined deceleration change amount may be previously set by a user.

For example, FIG. 8 illustrates an example of automatically converting a 2D screen to a 3D screen when a moving body moves in a speed limit or less at a segment of a speed limit, as in IC or JC of an express highway.

Referring to FIG. 8, while the moving body (e.g., a vehicle) travels an express highway in a constant speed (e.g., 100 Km/h), when the moving body enters junction segments A and B of the express highway, the controller 180 visually or aurally notifies a driver of the moving body that the moving body enters the junction segments A and B.

Further, the controller 180 controls to display a route c in which the moving body should travel via the junction segment.

Further, a speed in which the moving body enters the junction segments may be limited to a predetermined speed 12 or less. In this case, as the mobile terminal 100 arrives at a peripheral of the junction segment, a speed of the mobile terminal 100 is decelerated from 100 Km/h to a speed limit 40 Km/h within a predetermined time.

Accordingly, the controller 180 determines as a speed change amount is larger than a predetermined deceleration amount (e.g., a speed change of 40 Km/h for a predetermined time) and automatically converts 2D map data displayed on the touch screen 151 to 3D map data.

Alternatively, in order to highlight a location corresponding to the predetermined speed limit, the controller 180 may control to display only the junction segments A and B with a 3D image and to display the 3D image to overlap with the 2D map data.

In the foregoing embodiment, an example of selectively displaying 2D map data and 3D map data in a navigation mode based on a speed or a speed change amount of the mobile terminal 100 and an example of automatically converting the entire or some of the 2D map data to 3D map data were described.

The mobile terminal 100 can receive a transport protocol expert group (TPEG) service in a navigation mode. Data provided in the TPEG service include traffic information, accident information, news information, oil price information, and safety driving data, and the mobile terminal 100 provides TPEG data in a form of a protocol previously promised between a TPEG data collection company and a broadcasting company, a software company for providing a navigation map, and a navigation terminal manufacturer.

In the received TEPG data, data that may be applied to a method of controlling a mobile terminal according to an embodiment of the present invention may include traffic information or accident information. For example, the mobile terminal 100 may determine traffic jam segment information through the traffic information or accident information of the received TPEG data.

Figure 9:
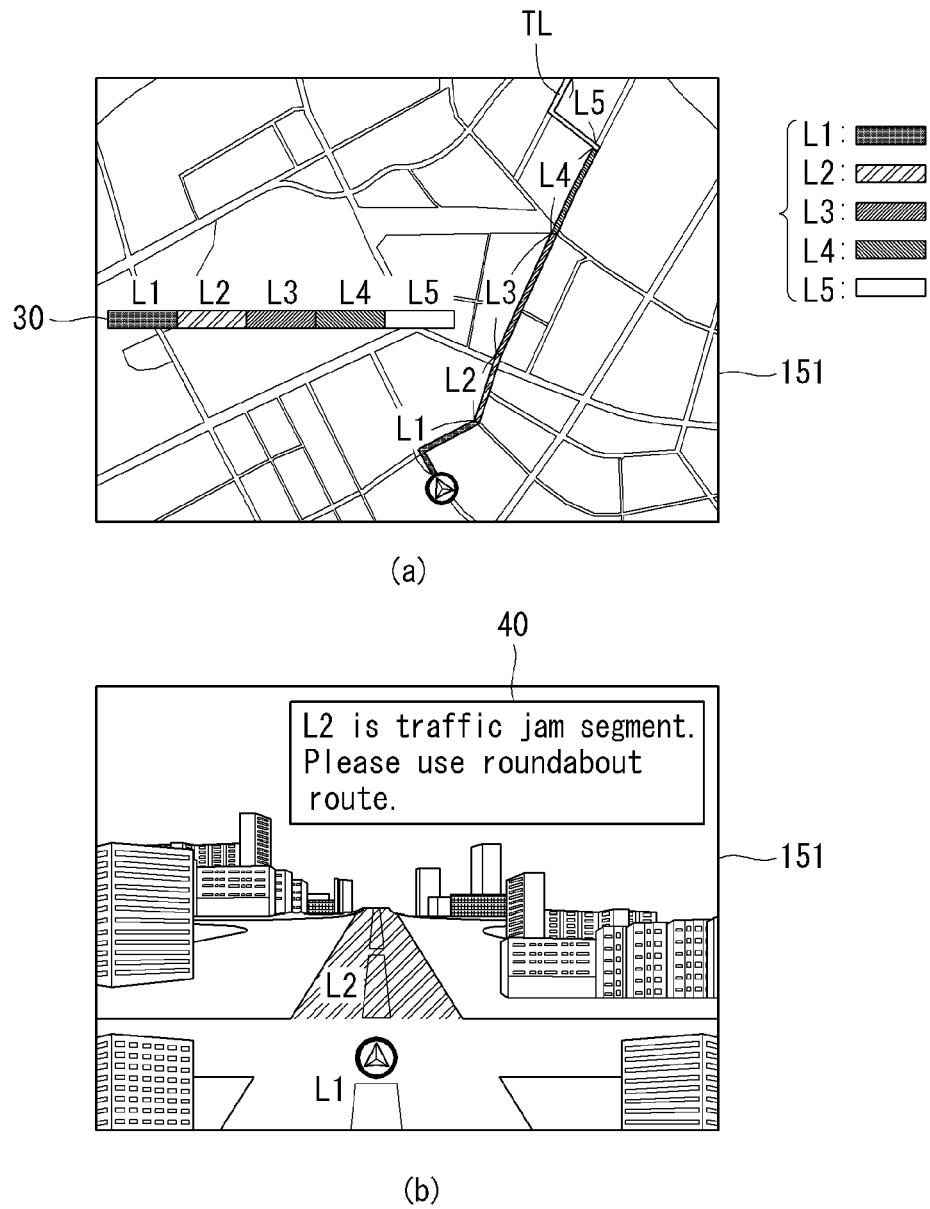

FIG. 9 illustrates an example of automatically converting a 2D screen of a traffic jam segment to a 3D screen using a TPEG service.

Referring to FIG. 9, the mobile terminal 100 sets a traveling route including a starting point and a destination in a navigation mode. The mobile terminal 100 provides route guidance according to the traveling route and reflects the received TPEG data to route guidance according to the traveling route.

Referring to FIG. 9A, a traffic jam segment according to the TPEG data is reflected to a plurality of segments constituting the traveling route. For example, a plurality of segments constituting the traveling route may be formed with L1, L2, L3, L4, and L5, and the received TPEG data visually expresses traffic jam information about each of the segments L1, L2, L3, L4, and L5 (e.g., a segment L11 is expressed with a green color, a segment L2 is expressed with a red color, a segment L3 is expressed with a yellow color, a segment L4 is expressed with a green color, and a segment L5 is expressed with a red color) and thus a driver can easily determine traffic jam information of a front traveling route.

Referring to FIG. 9B, while the mobile terminal 100 moves the segment L1, traffic jam information of the segment L2 is displayed as traffic jam (red color), and accordingly, in order for a driver to more easily determine a traffic jam segment L2, the controller 180 converts and provides 2D map data to 3D map data.

Further, the controller 180 may provide a message 40 notifying that the segment L2 is a traffic jam segment and a roundabout route may be used in addition to a preset traveling route on the touch screen 151.

Further, the controller 180 controls to display segment information newly notifying to a driver like the roundabout route with a 3D image and provides the 3D image on the touch screen 151.

Figure 11:
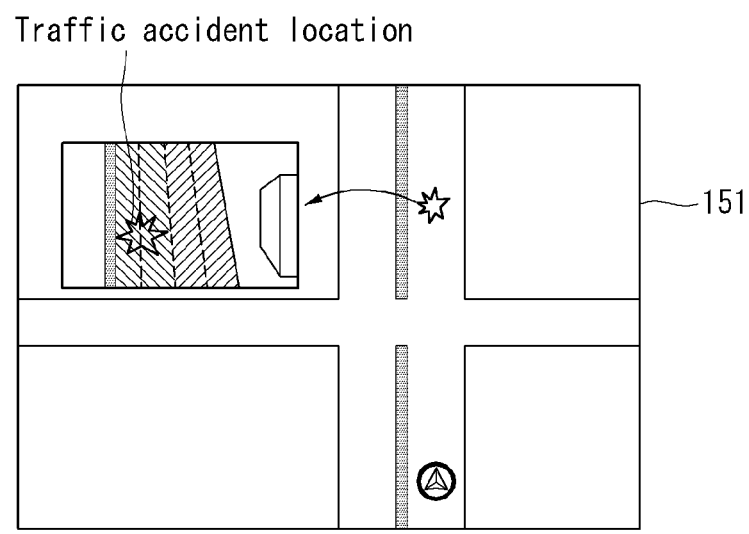

FIGS. 10 and 11 illustrate examples of automatically converting a 2D screen to a 3D screen when an unexpected situation occurs.

According to an embodiment of the present invention, when an unexpected situation occurs at the front while traveling, 2D map data are automatically converted to 3D map data.

Referring to FIG. 10A, the mobile terminal 100 acquires accident location information from the received TPEG data and displays the information on 2D map data.

Referring to FIG. 10B, in order to use the remaining lanes, except for a lane in which the accident occurs, the controller 180 controls to display information about a lane in which the accident occurs and the remaining lanes with a 3D image on the touch screen 151.

Referring to FIG. 11, in order to highlight the accident location, the controller 180 may control to display only the accident location with a 3D image and to display the 3D image on 2D map data.

That is, when the mobile terminal 100 moves in a low speed or when a speed change amount of the mobile terminal 100 changes from a low speed to a high speed for a predetermined time based on a speed or a speed change amount of the mobile terminal 100, the mobile terminal 100 according to an embodiment of the present invention converts 2D map data to 3D map data and thus improves a driver's visibility.

In the following embodiment, an event of converting 2D map data to 3D map data and causing to display the 3D map data occurs based on a speed or a speed change amount of the mobile terminal 100. However, the event may include an event related to a position of the mobile terminal 100.

Figure 12:
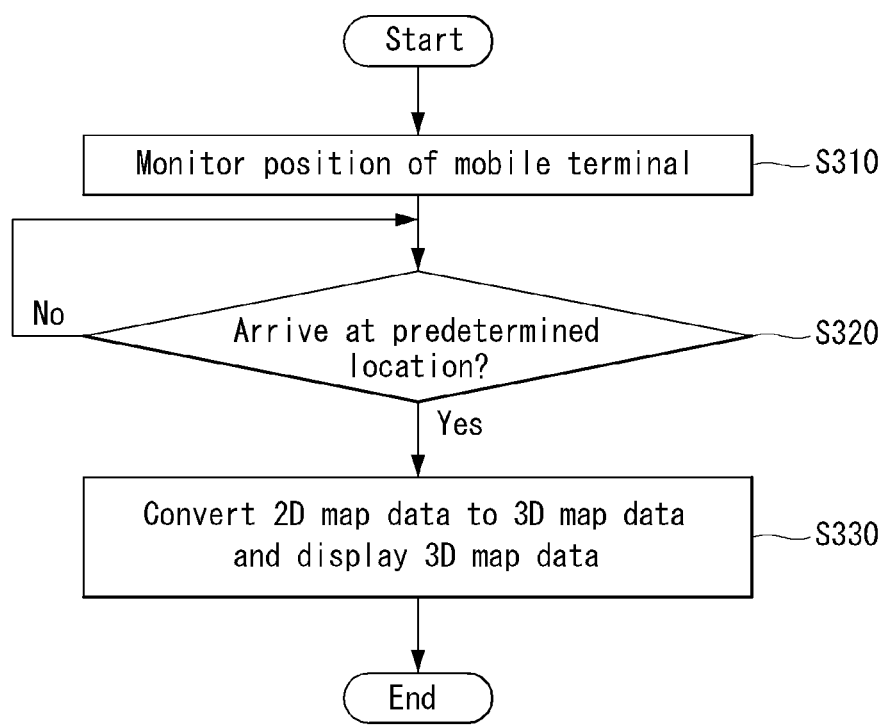
FIG. 12 is a flowchart illustrating a method of controlling a mobile terminal according to an embodiment of the present invention.
Figure 13:
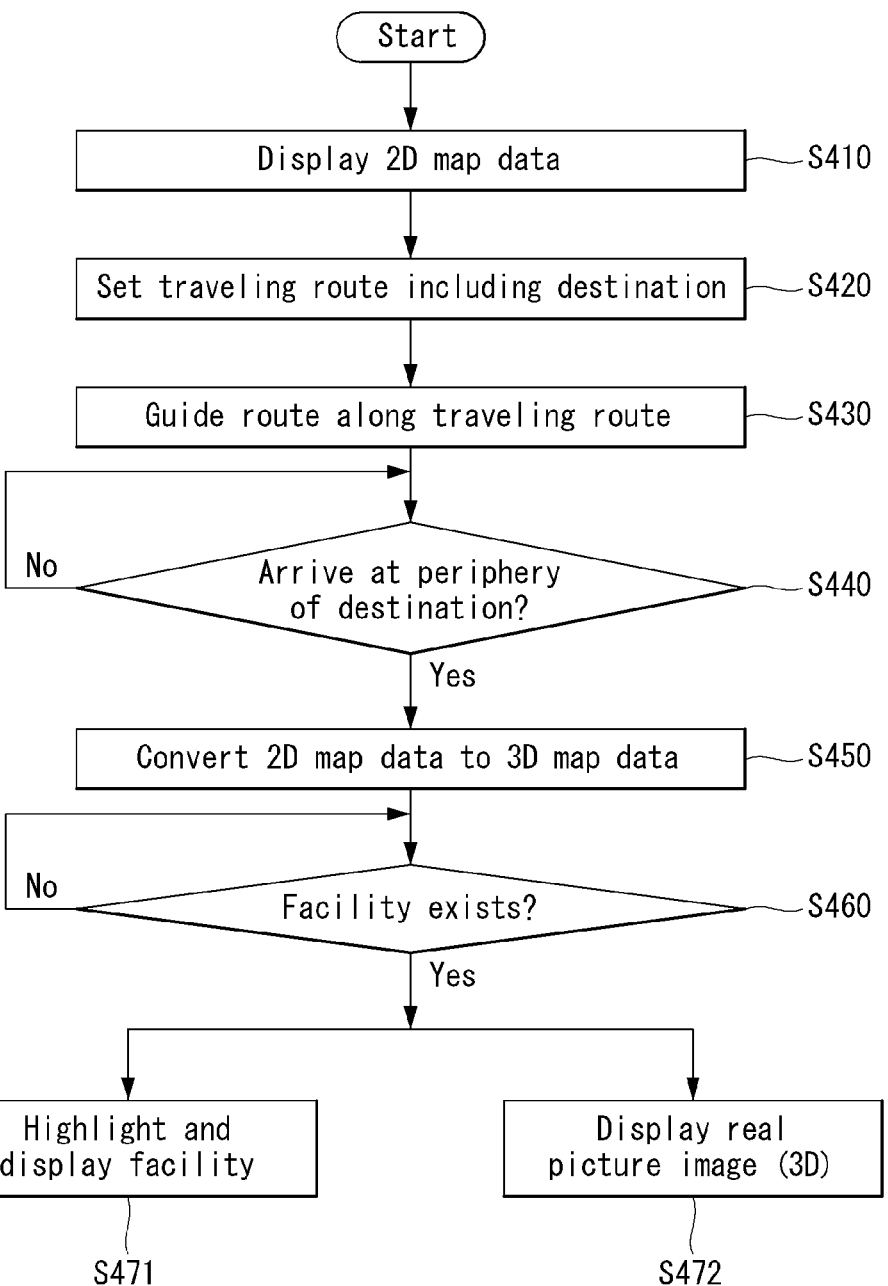
FIG. 13 is a flowchart illustrating the method shown in FIG. 12.

FIG. 12 is a flowchart illustrating a method of controlling a mobile terminal according to an embodiment of the present invention, FIG. 13 is a flowchart illustrating the method shown in FIG. 12, and FIGS. 14 to 16 are diagrams illustrating the method shown in FIG. 13. The control method may be performed by the control of the controller 180.

Referring to FIG. 12, the controller 180 monitors a position of the mobile terminal 100 (S310). The controller 180 controls to display to interlock a present position of the mobile terminal 100 with map data through a GPS coordinate acquired by the location information module 115.

Thereafter, the controller 180 determines whether the mobile terminal 100 arrives at a predetermined location (S320), and if the mobile terminal 100 arrives at a predetermined location, the controller 180 controls to convert 2D map data to 3D map data and to display the 3D map data (S330).

This will be described in detail with reference to FIG. 13.

Referring to FIG. 13, the controller 180 controls to display 2D map data in a navigation mode (S410). The controller 180 sets a traveling route including a starting point and a destination (S420) and guides a route along the preset traveling route (S430).

The controller 180 monitors whether the mobile terminal 100 arrives at a periphery of the preset destination (S440). The periphery of the destination is an area within a preset distance from the destination.

If the mobile terminal 100 arrives at a periphery of the destination, the controller 180 converts 2D map data displayed on the touch screen 151 to 3D map data (S450).

The controller 180 determines whether a specific structure (facility) exists at the destination (S460). If a specific structure (facility) exists at the destination, the controller 180 controls to highlight and display the facility corresponding to the 2D map data (S471) and to display a real picture image of the facility with a 3D image (S472).

Accordingly, when the destination exists at a side opposite to that of a traveling route, if a facility existing at the destination is highlighted and displayed before arriving at the destination, the mobile terminal 100 previously guides a lane change for a U-turn or a P-turn.

Referring to FIG. 14, when a traveling route is set and the moving body arrives at a periphery of a destination G2, the controller 180 controls to highlight and display a facility G3 existing at the destination while automatically converting a 2D screen (2DM) to a 3D screen (3DM).

Figure 15:
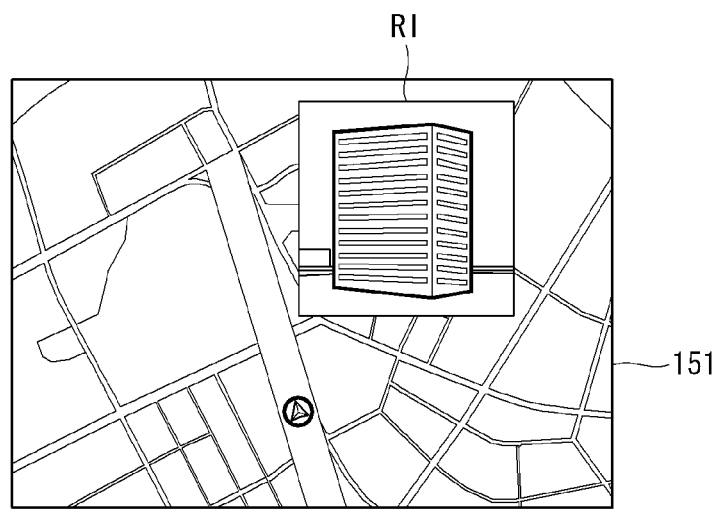

Referring to FIG. 15, when a traveling route is set and a moving body arrives at a periphery of the destination, the controller 180 controls to display a real picture image (RI) of a facility existing at the destination.

Figure 16:
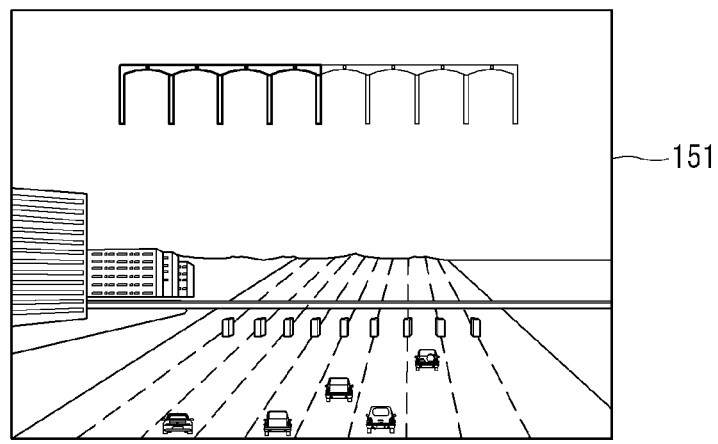

Referring to FIG. 16, while the moving body travels an express highway, the controller 180 controls to activate and display positions of tollgates and available tollgates in a plurality of tollgates when entering and exiting an express highway with a 3D image.

Accordingly, the moving body can be prevented from entering an inactivated tollgate of a plurality of tollgates.

Further, for the activated tollgate, the controller 180 controls to distinguishably display an E-Z pass segment, an activated gate, and a color of a lane corresponding to the activated gate.

According to an embodiment of the present invention, an event of converting 2D map data to 3D map data may be an illumination value of light collected through a photosensitive sensor provided in the mobile terminal 100.

Particularly, when the mobile terminal 100 enters within a predetermined building, an illumination value of light collected by the photosensitive sensor may decrease. However, even if the mobile terminal 100 does not enter a specific building, a sensing value by the photosensitive sensor may be sequentially reduced.

Accordingly, in an embodiment of the present invention, by simultaneously using a sensing value by the photosensitive sensor and GPS receiving sensitivity, 2D map data can be converted to 3D map data.

Figure 17:
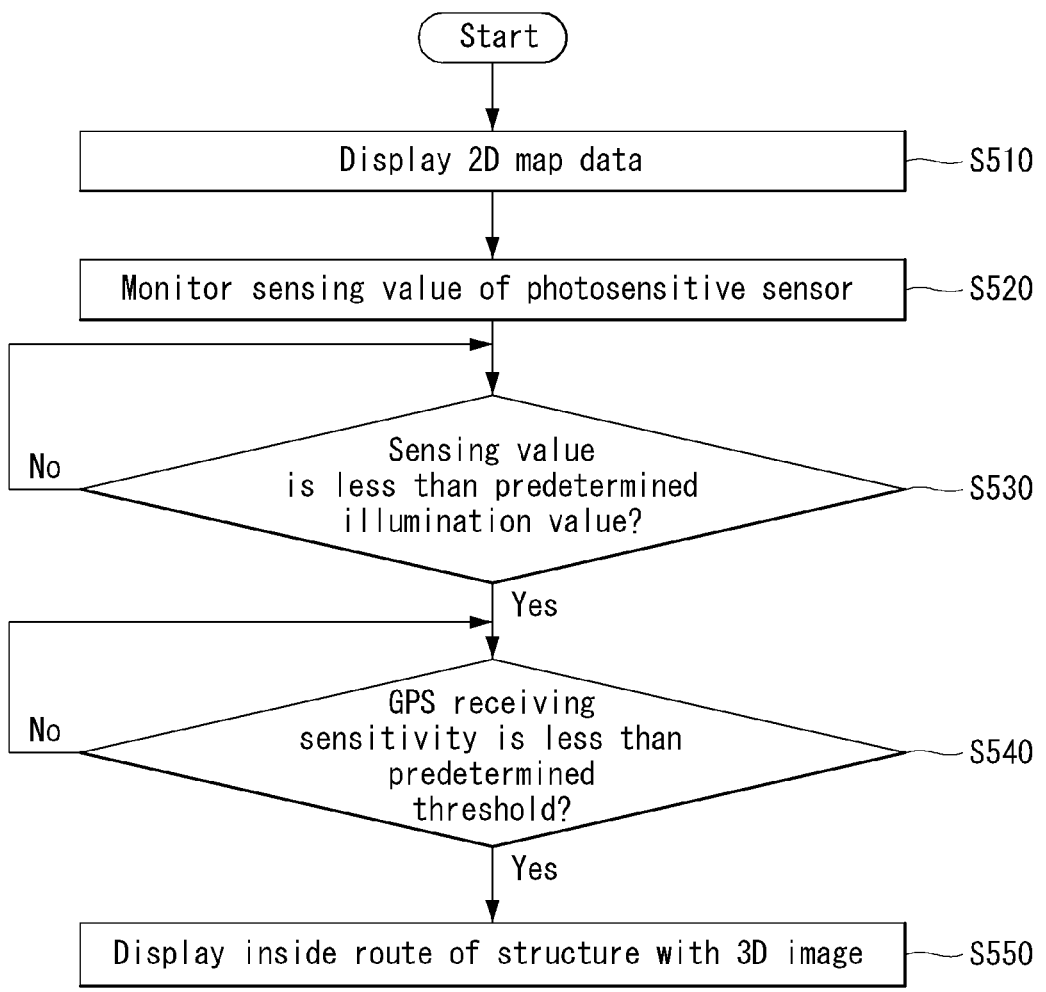
FIG. 17 is a flowchart illustrating a method of controlling a mobile terminal according to an embodiment of the present invention.
Figure 18:
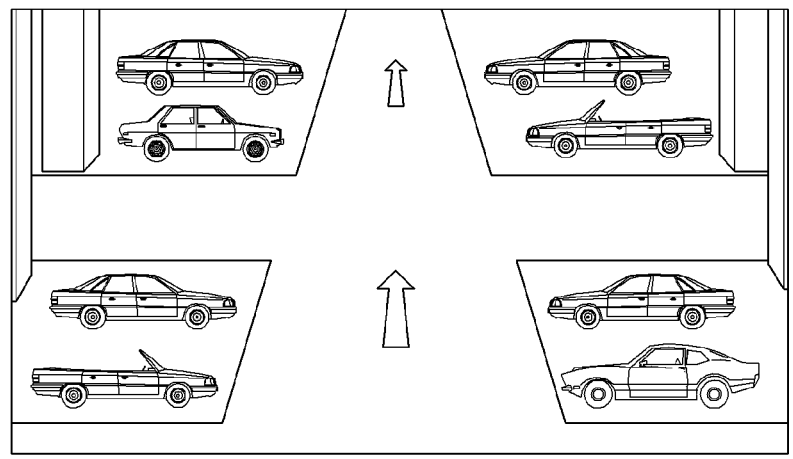
FIG. 18 is an example of a screen illustrating the method shown in FIG. 17.

FIG. 17 is a flowchart illustrating a method of controlling a mobile terminal according to an embodiment of the present invention, and FIG. 18 is an example of a screen illustrating the method shown in FIG. 17. The control method may be performed by the control of the controller 180.

Referring to FIG. 17, the controller 180 controls to display 2D map data on the touch screen 151 (S510).

The mobile terminal 100 monitors a sensing value by illumination of light collected from the photosensitive sensor (S520).

Particularly, when a destination of a traveling route is a predetermined structure and the mobile terminal 100 enters the structure, the controller 180 determines whether a sensing value collected by the photosensitive sensor is less than a predetermined illumination value (S530), and if a sensing value collected by the photosensitive sensor is less than a predetermined illumination value, the controller 180 determines whether GPS receiving sensitivity is less than a predetermined threshold (S540), and if GPS receiving sensitivity is less than a predetermined threshold, the controller 180 controls to display an inside route of the structure with a 3D image (S550).

Here, information about the inside route of the structure may be acquired from a GPS system installed in the structure. For example, the GPS system may include a GPS receiver and a GPS repeater installed at the outside of the structure.

The GPS system provided in the structure transfers a GPS signal received from the GPS receiver to the GPS repeater, and the GPS repeater transfers the received GPS signal to the mobile terminal 100 entering at the structure. Accordingly, the mobile terminal 100 receives a GPS signal from a GPS system of the structure instead of the location information module 115 provided therein, thereby acquiring a relative position of the mobile terminal 100.

Further, the mobile terminal 100 may previously store data about an internal structure of a specific structure, and when the mobile terminal 100 enters the specific structure, the mobile terminal 100 may provide map data about the internal structure of the specific structure through the touch screen 151. Map data about an internal structure of the structure may be provided with 3D image.

Referring to FIG. 18, when the mobile terminal 100 enters a specific structure IF, if a sensing value of a photosensitive sensor provided in the mobile terminal 100 is smaller than a predetermined illumination value and receiving sensitivity of a received GPS signal is smaller than a predetermined threshold, the mobile terminal 100 displays an inside route of the specific structure IF with a 3D image on the touch screen 151.

According to an embodiment of the present invention, an event of converting 2D map data to 3D map data may include an event in which the mobile terminal 100 transmits and receives a communication call connection signal.

Figure 19:
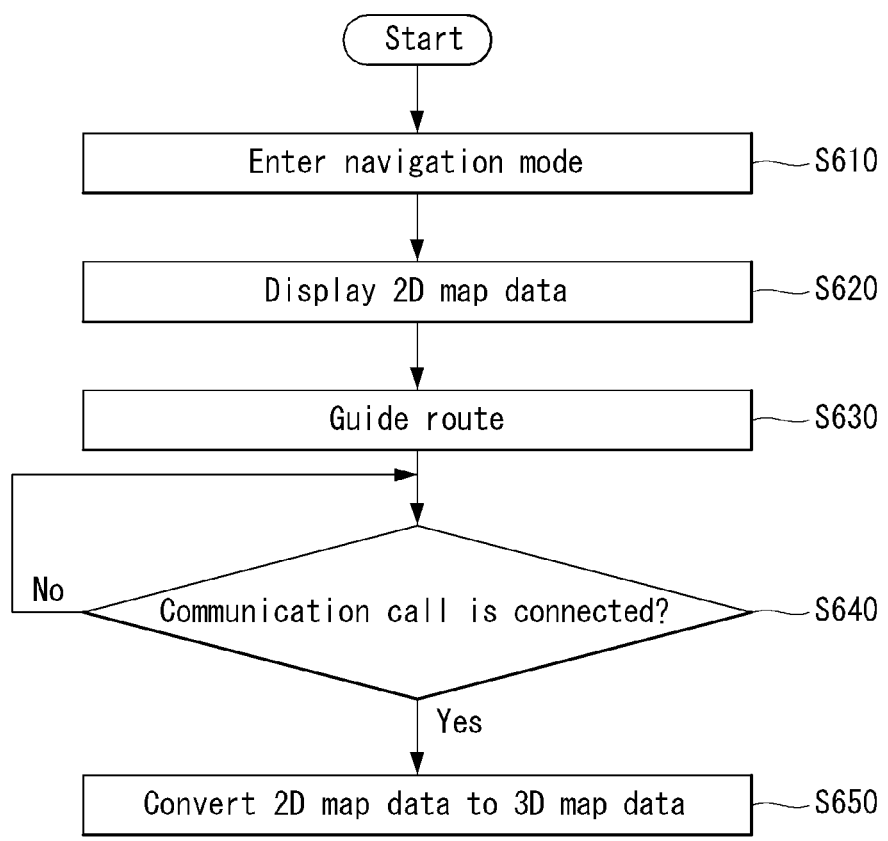
FIG. 19 is a flowchart illustrating a method of controlling a mobile terminal according to an embodiment of the present invention.
Figure 20:
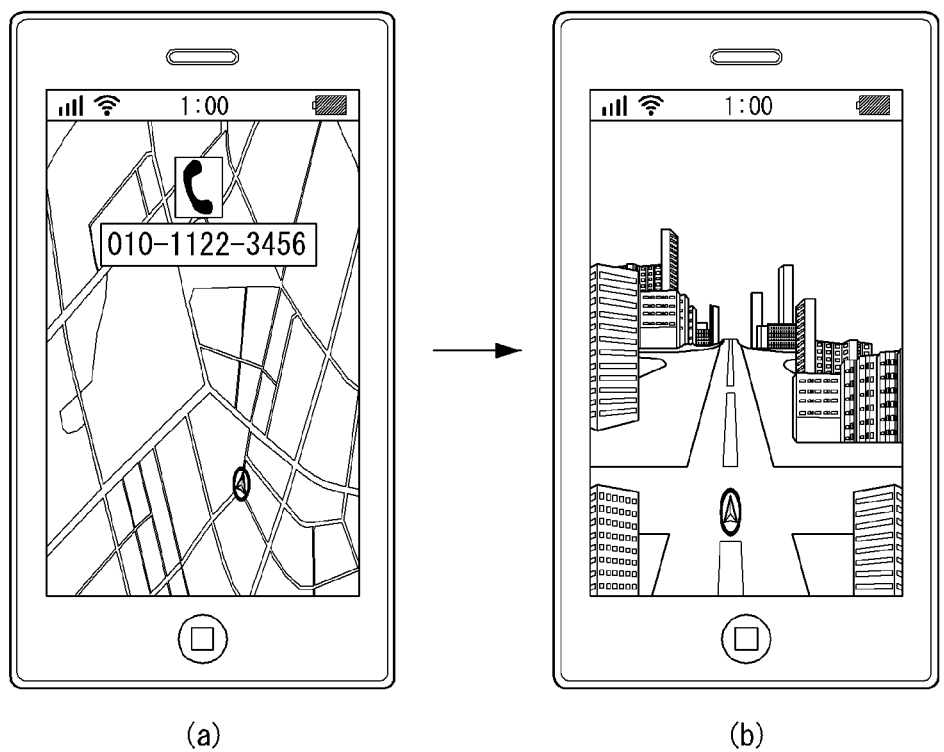
FIGS. 20 and 21 are examples of screens illustrating the method shown in FIG. 19.
Figure 21:
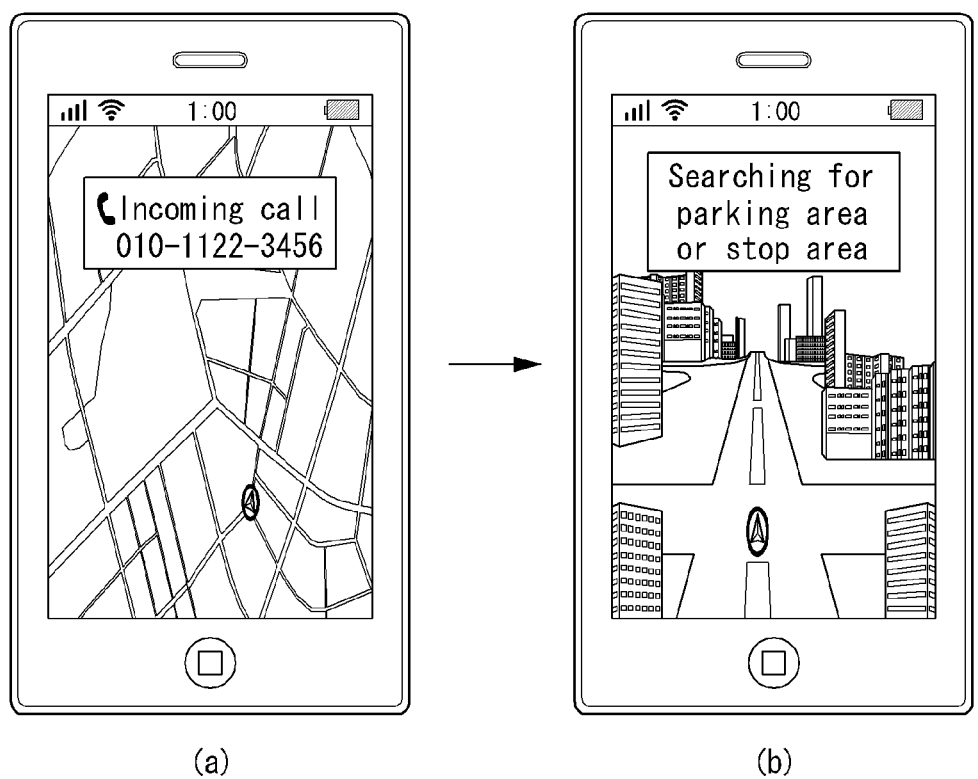

FIG. 19 is a flowchart illustrating a method of controlling a mobile terminal according to an embodiment of the present invention, and FIGS. 20 and 21 are examples of screens illustrating the method shown in FIG. 19. The control method may be performed by the control of the controller 180.

The mobile terminal 100 enters a navigation mode (S610), displays 2D map data on the touch screen 151 (S620), and guides a route (S630).

The controller 180 determines whether an event of transmitting and receiving a communication call connection request signal occurs in the navigation mode (S640), and if an event of transmitting and receiving a communication call connection request signal occurs in the navigation mode, the controller 180 converts 2D map data to 3D map data (S650).

The mobile terminal 100 requests a communication call connection to an external terminal through the mobile communication module 112, or receives a communication call connection request from an external terminal.

However, in this case, in the communication call connection mode, the controller 180 may activate the microphone 122 (see FIG. 1) and the audio output module 152 (see FIG. 1) provided in the mobile terminal 100 and operate a navigation mode (task 1) and a communication call connection mode (task 2) by multitasking.

Therefore, while a user receives a route guidance service in a navigation mode, the user can receive a communication call connection service.

Here, when a communication call connection service is provided, a driver may be in a distraction state and thus when a communication call is connected or when a request for a communication call connection exists, the controller 180 automatically converts 2D map data to 3D map data, thereby improving the driver's attention.

Referring to FIG. 20, in a state in which 2D map data are displayed on the touch screen 151, when a communication call connection request signal is received, the controller 180 controls to convert the 2D map data to 3D map data and to display the 3D map data.

Referring to FIG. 21, in a state in which 2D map data are displayed on the touch screen 151, when a communication call connection request signal is received, while the controller 180 converts the 2D map data to 3D map data, the controller 180 searches for a parking area or a stop area based on a present position of the mobile terminal 100 and guides the result through 3D map data.

For example, while a moving body travels an express highway and traveling route guidance is provided through the mobile terminal 100, when a signal for requesting a communication call connection is received in the mobile terminal 100, the controller 180 controls to display information related to a resting place or an emergency stop area closest to a present position with a 3D image on the touch screen 151.

Figure 22:
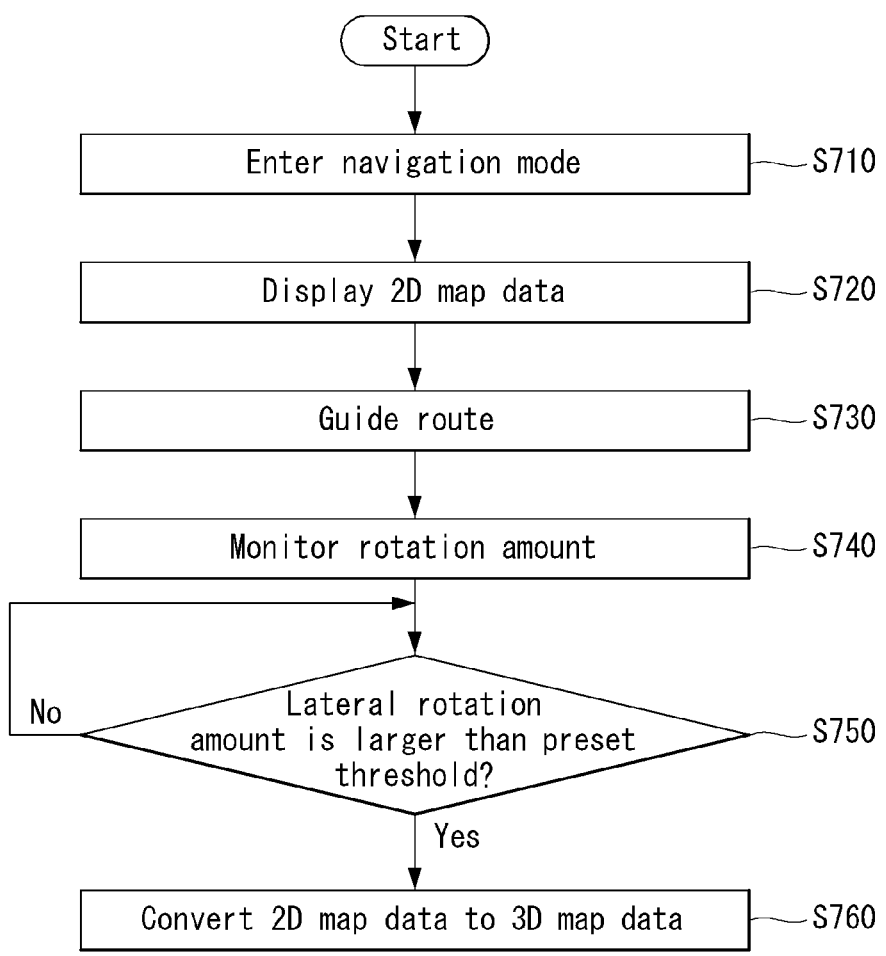
FIG. 22 is a flowchart illustrating a method of controlling a mobile terminal according to an embodiment of the present invention.
Figure 23:
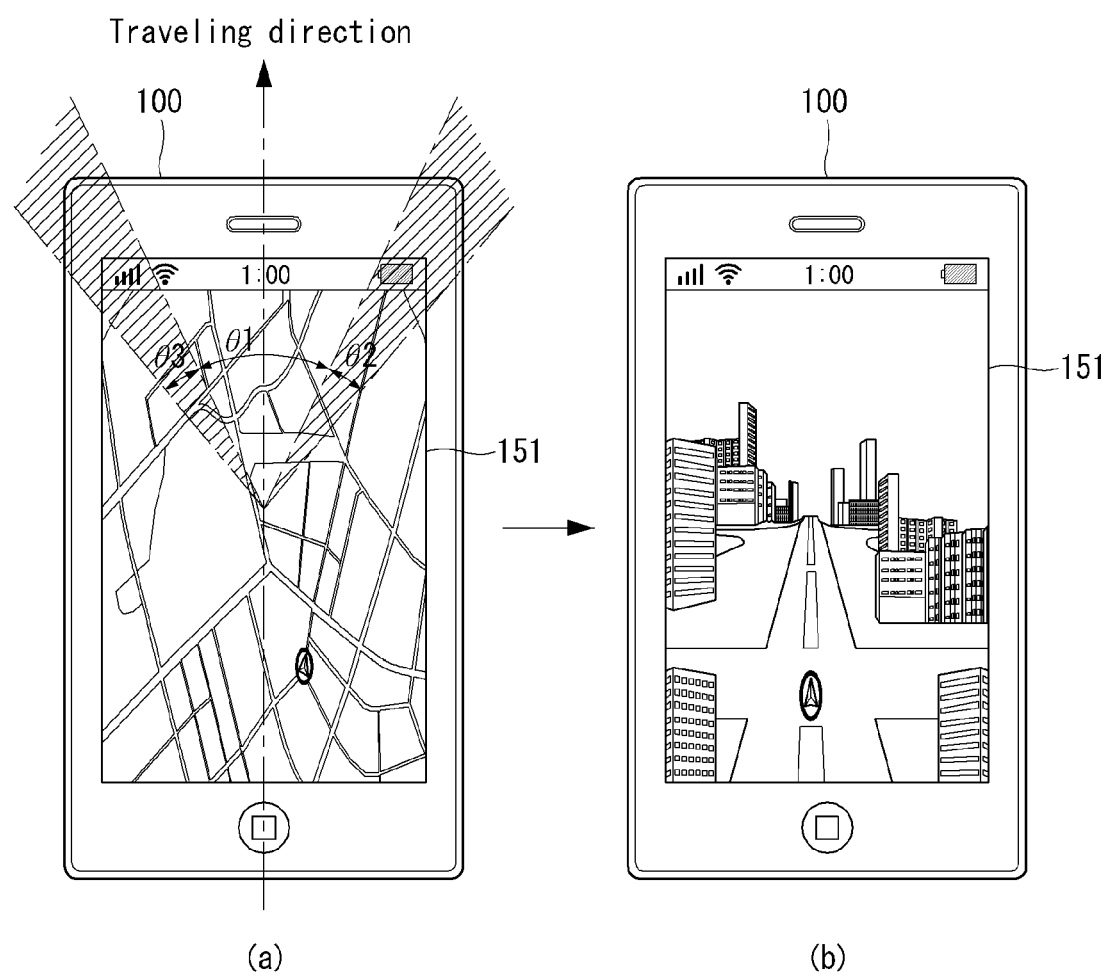
FIG. 23 is a diagram illustrating the method shown in FIG. 22.

FIG. 22 is a flowchart illustrating a method of controlling a mobile terminal according to an embodiment of the present invention, and FIG. 23 is a diagram illustrating the method shown in FIG. 22. The control method may be performed by the control of the controller 180.

According to a method of controlling a mobile terminal according to an embodiment of the present invention, a driver's driving state is acquired through various sensing units (see 140 of FIG. 1) of the mobile terminal 100, 2D map data are converted to 3D map data according to the driver's driving state, and thus the driver's attention is called.

Referring to FIG. 22, the mobile terminal 100 enters a navigation mode (S710), displays 2D map data on the touch screen 151 (S720), and provides a route guidance service (S730).

In the navigation mode, the mobile terminal 100 monitors a rotation amount of a moving body (S740).

The sensing unit 140 of the mobile terminal 100 may include a gyro sensor (not shown). Accordingly, the mobile terminal 100 acquires a rotation amount of the mobile terminal 100 from an angular velocity acquired through the gyro sensor.

The controller 180 determines whether a lateral rotation amount of the mobile terminal 100 is larger than a preset threshold (S750), and if a lateral rotation amount of the mobile terminal 100 is larger than a preset threshold, the controller 180 controls to convert 2D map data to 3D map data and to display the 3D map data (S760).

Referring to FIG. 23, the threshold is an allowable rotation amount $\theta_1$ of a moving body while traveling. The rotation amount $\theta 1$ indicates a degree of rotating to the left side and a degree of rotating to the right side using a traveling direction of a moving body as a reference axis.

For example, when a driver dozes off at the wheel, a sensing value of a gyro sensor of the mobile terminal 100 is larger than the rotation amount $\theta 1$, and the rotation amount enters within an area $\theta 2$ or $\theta 3$. In this case, the controller 180 converts 2D map data to 3D map data, thereby calling a driver's attention.

As described in the foregoing embodiments, according to an embodiment of the present invention, 2D map data provided in a navigation mode can be automatically converted to 3D map data through various sensing values acquired through the sensing unit 140 of the mobile terminal 100. Further, the mobile terminal 100 can selectively apply 2D map data and 3D map data based on the sensing value.

The above-described method of controlling a mobile terminal according to the present invention may be written and provided in a computer readable recording medium with a program to execute in a computer.

The method of controlling the mobile terminal according to the present invention may be executed through software. When executed with the software, constituent means of the present invention are code segments that perform required tasks. Programs or code segments may be stored in a processor readable medium or may be transmitted by a computer data signal combined with a carrier through a transmission medium or a communication network.

The computer readable recording medium may be any data storage device for storing data that can be read by a computer system. The computer readable recording medium may include, for example, a read-only memory (ROM), a random-access memory (RAM), a CD-ROM, a DVD+ROM, a DVD-RAM, a magnetic tape, a floppy disk, a hard disk, and an optical data storage device. The computer readable recording medium may also be distributed in a computer system connected to a network and thus a computer readable code may be stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal comprising:
   a display unit;
   a database comprising two-dimensional (2D) map data and three-dimensional (3D) map data;
   a photosensitive sensor configured to detect light a location information module configured to acquire a position of the mobile terminal; and
   a controller configured to:
   enter a navigation mode for providing route guidance information,
   display 2D map data on the display unit,
   change the displayed 2D map data to 3D map data corresponding to the 2D map data, when a position of the mobile terminal acquired through the location information module arrives at a predetermined location, and display 3D map data of the internal structure of a facility, when the facility exists at the predetermined location and illumination of light detected by the photosensitive sensor is a predetermined threshold or less.

2. The mobile terminal of claim 1, further comprising a sensing unit,
wherein the controller is configured to display selectively the 2D map data or the 3D map data according to speed information, the speed information comprising at least one of a speed and a speed change amount of the mobile terminal through the sensing unit.

3. The mobile terminal of claim 2, wherein the sensing unit comprises at least one of a GPS receiving unit and an acceleration sensor.

4. The mobile terminal of claim 2, wherein the controller is configured to represent the 2D map data to the 3D map data on the display unit, when a speed of the mobile terminal is less than a predetermined threshold or when a deceleration change amount of the speed is larger than a predetermined threshold.

5. The mobile terminal of claim 2, wherein the controller is configured to display the 2D map data and 3D map data based on traffic jam segment information from a traffic information service and speed information of the mobile terminal.

6. The mobile terminal of claim 1, wherein the controller is configured to control the display unit to highlight a facility on map data, or to display detailed information within the facility or a real picture image of the facility, when the facility exists at predetermined location.

7. The mobile terminal of claim 1, further comprising a GPS receiving unit,
wherein the controller is configured to provide the inside route of the facility with a 3D image based on illumination of light detected by the photosensitive sensor and sensitivity of a GPS signal acquired through the GPS receiving unit.

8. The mobile terminal of claim 1, further comprising a gyro sensor configured to detect a rotation amount of the mobile terminal,
wherein the controller is configured to represent the 2D map data to the 3D map data on the display unit, when the rotation amount is larger than the predetermined threshold based on a traveling direction of the mobile terminal.

9. A method of controlling a mobile terminal, comprising a display unit, a database comprising two-dimensional (2D) map data and three-dimensional (3D) map data; a photosensitive sensor configured to detect light; and a location information module configured to acquire a position of the mobile terminal, the method comprising:
entering a navigation mode for providing route guidance information;
displaying 2D map data corresponding to the route on a display unit;
controlling the display unit to change the displayed 2D map data to 3D map data corresponding to the 2D map data, when a position of the mobile terminal acquired through the location information module arrives at a predetermined location; and
displaying 3D map data of the internal structure of a facility, when the facility exists at the predetermined location and illumination of light detected by the photosensitive sensor is a predetermined threshold or less.

10. The mobile terminal of claim 1, further comprising a mobile communication module,
wherein the controller is further configured to display the 3D map data on the display unit when a communication call is connected and to operate the navigation mode and a communication call connection mode by multitasking.

11. The mobile terminal of claim 10, wherein the controller is configured to represent the 2D map data to the 3D map data on the display unit, if the communication call is terminated.

12. The mobile terminal of claim 1, wherein the controller is configured to search for a stop area based on a present position of the mobile terminal and display a guide information about a search result through 3D map data.

* * * * *